United States Patent [19]
Joshi et al.

[11] Patent Number: 5,889,693
[45] Date of Patent: Mar. 30, 1999

[54] CMOS SUM SELECT INCREMENTOR

[75] Inventors: Vivek Joshi, Sunnyvale; Sudarshan Kumar, Fremont, both of Calif.

[73] Assignee: Intel Corporation, Santa Clara, Calif.

[21] Appl. No.: 851,220

[22] Filed: May 5, 1997

[51] Int. Cl.⁶ ................................................. G06K 7/50
[52] U.S. Cl. ........................................................ 364/770
[58] Field of Search ........................... 364/770, 784.01, 364/786.02, 788

[56] References Cited

U.S. PATENT DOCUMENTS

| | | | |
|---|---|---|---|
| 5,504,698 | 4/1996 | Su | 364/770 |
| 5,555,517 | 9/1996 | Agrawal et al. | 364/770 |
| 5,682,342 | 10/1997 | Suzuki | 364/770 |

Primary Examiner—David H. Malzahn
Attorney, Agent, or Firm—Blakely, Sokoloff, Taylor & Zafman LLP

[57] ABSTRACT

A method and apparatus for a CMOS inverter is provided for incrementing a first number by a one, three, or multiple of two. The incrementing unit includes an extract/restore unit for extracting a number of least significant bits from the first number, thereby producing a second number. The number of least significant bits extracted is determined by the incrementing value. The incrementing unit further includes an adjusting unit for adding an adjusting value to the least significant bits extracted from the first number, thereby producing an adjusted least significant bits. The incrementing unit further includes an incrementor block for receiving the second number and incrementing the second number, thereby producing a fourth number. The the extract/restore unit further for restoring the adjusted least significant bits to the fourth number, thereby producing a final result.

20 Claims, 11 Drawing Sheets

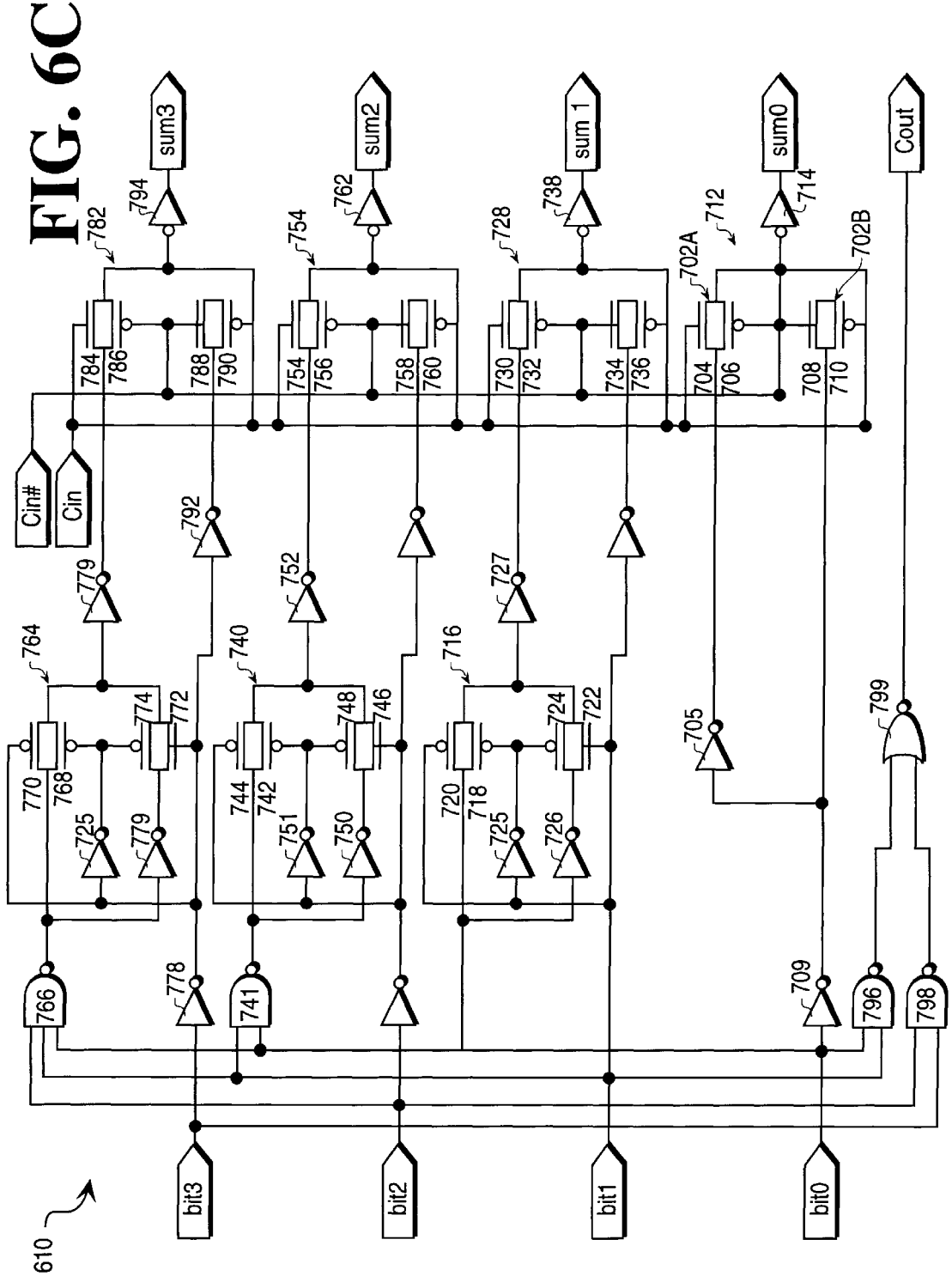

CMOS SUM SELECT INCREMENTOR

FIELD OF THE INVENTION

The present invention relates to digital computation circuits, and more specifically, to incrementors.

BACKGROUND OF THE INVENTION

Fundamental to the operation of any computer is the microprocessor. The microprocessor performs a number of arithmetic or logical "bitwise" calculations on its various inputs. One necessary arithmetic operation inherent in most advanced integrated circuit components, particularly microprocessors, is the ability to increment numbers in order to monitor the occurrence of events during each clock cycle.

Throughout the development of integrated circuit components, a constant emphasis has been placed on increasing their speed of operation. Typically, this is accomplished by reducing signal propagation delays encountered by the integrated circuit component in completing a particular arithmetic operation.

FIG. 1 shows one prior art method of incrementing, using an n-bit ripple-carry incrementor. The n-bit ripple-carry incrementor 100 includes n identical cells 100a–100n, where n is an arbitrary integer. The n identical cells 100a–100n are connected in series. Each of these cells receives the carry output of the previous cell. The first cell 100a has as an input the carry input c[o], while each of the other cells receives the carry output of the previous cell. Thus, cell 100k receives c[k–1] from cell 100[k–1]. Each cell also has as an input an input operand A[n], A[o] through A[n–1] respectively.

Each cell 105a–105i of the ripple-carry incrementor 100 comprises a XOR gate 110a–110n and an AND gate 115a–115n, which collectively enable each cell 100a–100n to perform two logical operations. Using the K<th> cell for illustrative purposes, its XOR gate 110k receives a ripple carry propagate "C[k–1]" bit from the K–1<th> cell (not shown) via a first input line 120 and an A[k–1] input bit via a second input line 125. Based on these inputs, the XOR gate 100k produces a real bit sum S[k–1] which is output from the incrementor 100 through a first output line 130. The K<th> cell also produces a ripple carry propagate "C[k]" bit via a second output line 135. The C[k] bit is a product of the C[k–1] bit logically AND'ed with the A[k–1] input bit.

Although the conventional ripple-carry incrementor 100 is simple and requires little area and device count being the overall number of transistors required by the incrementor, its total signal propagation delay to calculate the real bit sum "S[n]" is large due to serial propagation of each ripple carry propagate. For example, for an n-bit ripple-carry incrementor, the total signal propagation delay is approximately equal to n gate delays. Thus, the ripple carry incrementor is slow.

Generally, it is desirable to decrease the total signal propagation delay in order to increase the operational speed of the incrementor. This may be accomplished by sacrificing some area and device count. For example, incrementors using carry lookahead or Kogge-Stone techniques are specifically designed to reduce signal propagation delay. Unfortunately, these incrementors require significantly larger area and device count than conventional ripple carry incrementors.

Therefore what is needed is an incrementor that is faster than the ripple carry while requiring less area and fewer devices.

BRIEF SUMMARY OF THE INVENTION

The present invention is an incrementing unit for incrementing a first number by a one, three, or multiple of two. The incrementing unit includes an extract/restore unit for extracting a number of least significant bits from the first number, thereby producing a second number. The number of least significant bits extracted is determined by the incrementing value. The incrementing unit further includes an adjusting unit for adding an adjusting value to the least significant bits extracted from the first number, thereby producing an adjusted least significant bits. The incrementing unit further includes an incrementor block for receiving the second number and incrementing the second number, thereby producing a fourth number. The the extract/restore unit further for restoring the adjusted least significant bits to the fourth number, thereby producing a final result.

In one embodiment, the incrementor block has a first subsection which has a first plurality of data lines as an input. The first subsection is designed to calculate an incremented output and a carry-out value. The incrementor further includes a second subsection having a second plurality of data lines as the input. The second subsection is designed to calculate a first value of an incremented sum for a carry-in value of zero and a second value of the incremented sum for the carry-in value of one. The incrementor further includes a carry generation and propagation block for receiving the carry-out value generated by the first subsection and generating a selector which selects the first value or the second value of the incremented sum based on the calculated carry-out value calculated by the first subsection.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6C is a circuit diagram of the 4-bit incrementor utilized in FIG. 6A.

DETAILED DESCRIPTION OF THE PREFERRED EMBODIMENT

A method and apparatus for a CMOS sum select incrementor is described. In the following description, for the purposes of explanation, numerous specific details are set forth in order to provide a thorough understanding of the present invention. It will be apparent, however, to one skilled in the art that the present invention may be practiced without these specific details.

Figure 1:
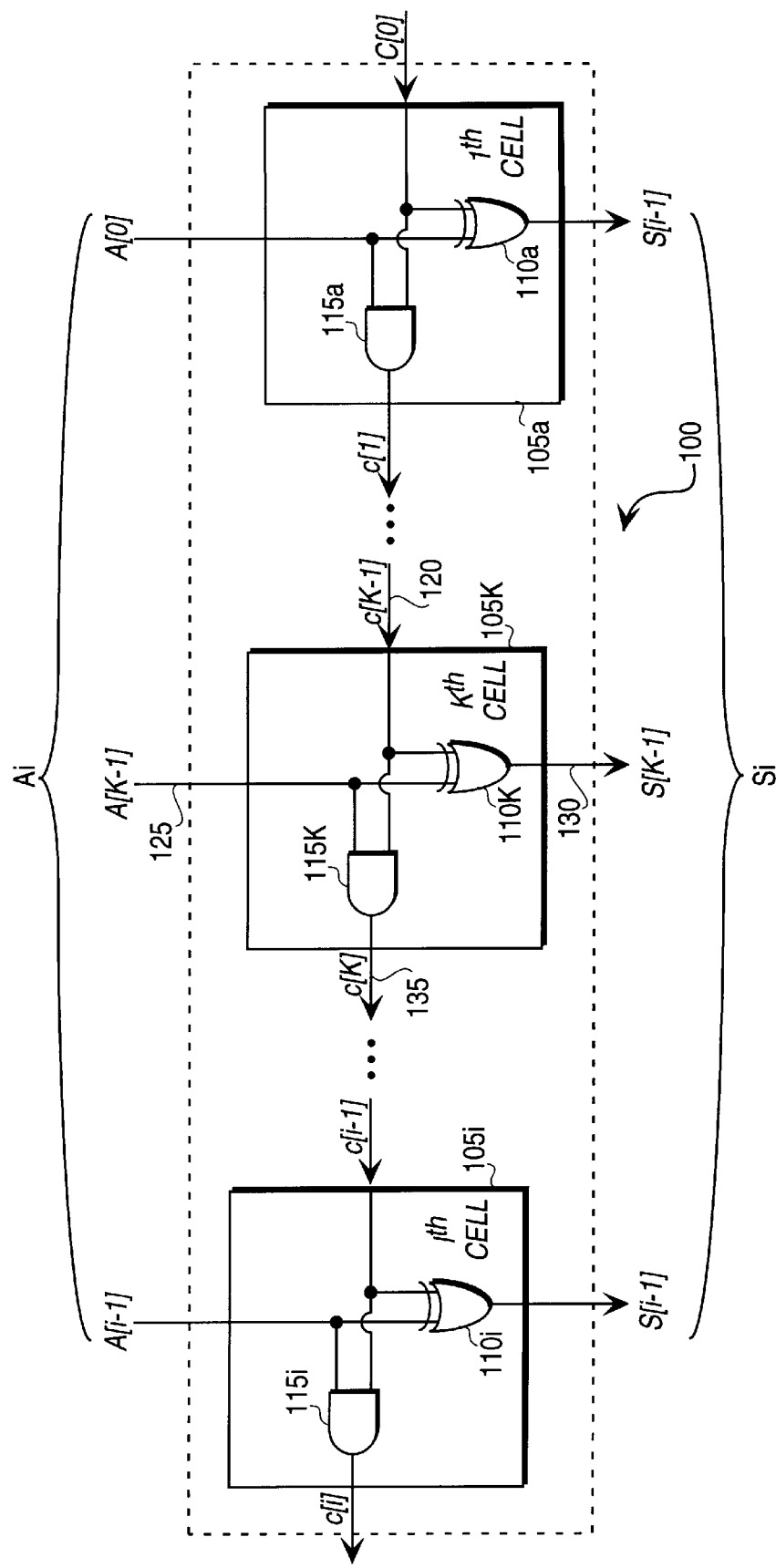
FIG. 1 is a diagram of a prior art ripple-carry incrementor.
Figure 2:
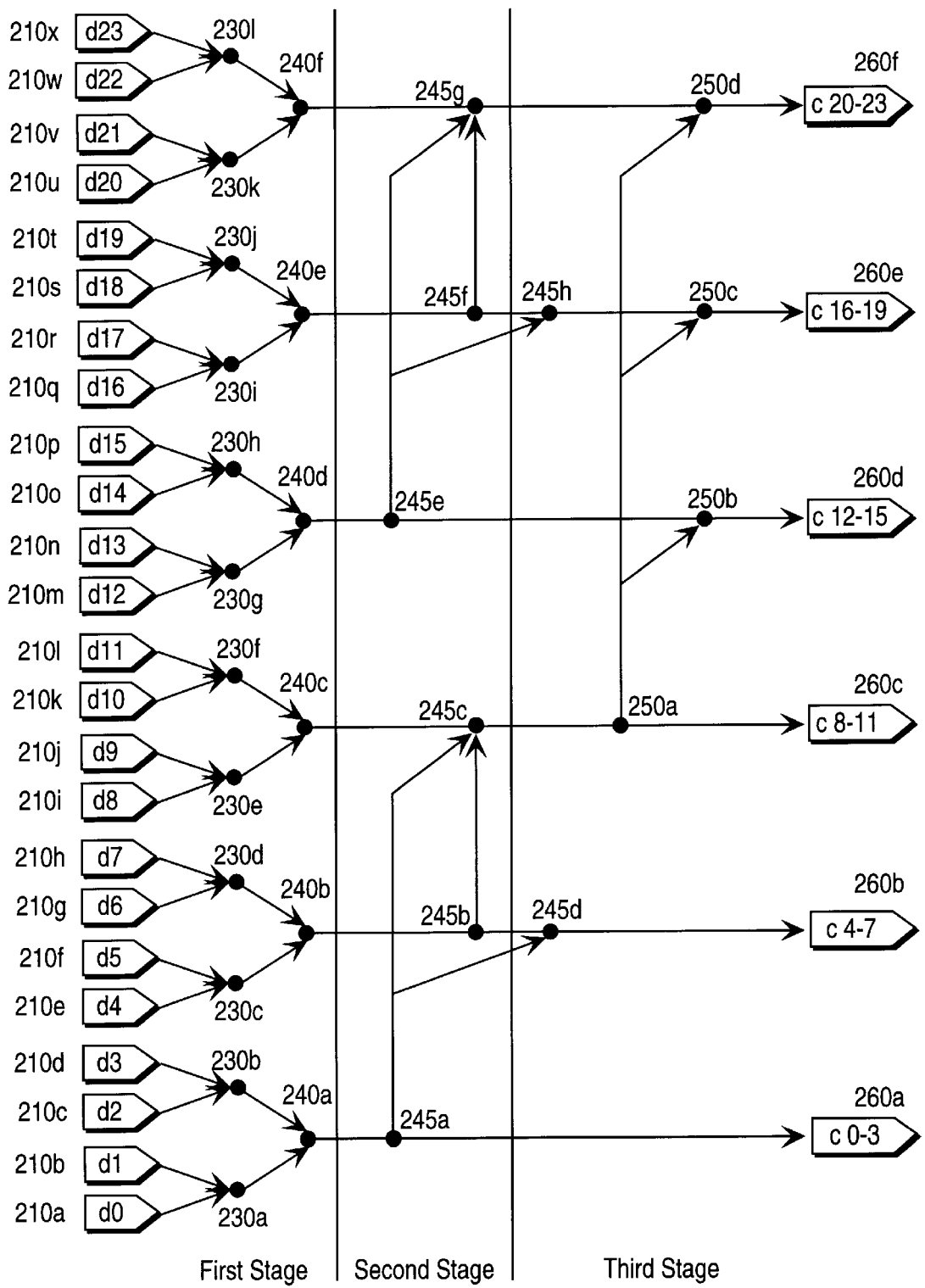
FIG. 2 is a tree diagram of the carry generator and propagator in the present invention.

FIG. 2 is a tree diagram of the carry generation and propagation block of the present invention. The present invention differs from the prior art in that the generation of the carry out is carried out separately from the generation of the incremented sum. By processing the carry out signal and the sum in parallel, the speed of the incrementor can be increased. FIG. 2 illustrates an exemplary tree arrangement for a 24-bit incrementor carry generation and propagation logic.

The primary nodes are the inputs of the data lines 210a–210x. The data lines 210a–210x input the bits for the value to be incremented into the incrementor of the present invention. Data bits 0 and 1 are coupled to node 230a, while data bits 2 and 3 are coupled to node 230b, and so on. There are 12 nodes in the first set of subsidiary nodes 230a–230l.

Each two nodes of the first set of subsidiary nodes 230a–230l are coupled to a second set of nodes 240a–240f. Thus, nodes 230a and 230b are coupled to node 240a, nodes 230c and 230d are coupled to node 240b, and so on. There are six nodes in the second set of subsidiary nodes 240a–240f.

The primary nodes 210a–x, first set of secondary nodes 230a–230l and second set of subsidiary nodes 240a–240f form a first stage for tree 200. In an alternative embodiment, all of the first stage may be implemented in a single step. If the data input values are guaranteed to be stable, either by latching, or by any other means, the steps performed in the first stage may be combined and executed in a single domino logic block.

The second stage of the tree 200 consists of the interconnections between three nodes. The node 240a is coupled to nodes 245a and 245c. Node 240b is also coupled to nodes 245b and 245c. Node 240d is coupled to nodes 245e and 245g. Node 240e is coupled to nodes 245f and 245g. Node 240f is coupled to node 245g. Note that at this stage the tree diagram only has two regions. The lower region includes data lines 210a–210l, and the region branch includes data lines 210m–210x.

The third stage of the tree 200 consists of interconnections between the lower branch and higher branch. Node 245a is coupled to node 245d. Node 245e is coupled to node 245h. The highest branch of the lower region, node 250a, is coupled to each of the branches in the upper region. Thus, node 250b has inputs from node 245e and node 250a. Node 250c has inputs from node 245f and 250a. Node 250d has inputs from node 245h and 250a.

Each of the final nodes, 245a, 245d, 250a, 250b, 250c, 250d are the output carry values, 260a–260f. The highest carry output, node 260f, is the final carry out of the incrementor. Thus, it can be seen that the propagation is split into three stages, and is considerably faster than conventional ripple carry implementations. Furthermore, as can be seen, each data line 210a–210x only has to drive a limited number of other devices. Thus, the highest number of devices are driven from the lowest data bits, 210a–210d. In this example, data bits 210a–210d drive only four devices. In comparison, a ripple carry implementing a 24 bit incrementor would require the lowest data bit to drive up to 24 devices. Thus, the device size can be scaled down for the present implementation, as is known in the art, in light of the fewer number of devices driven by each device.

Figure 3A:
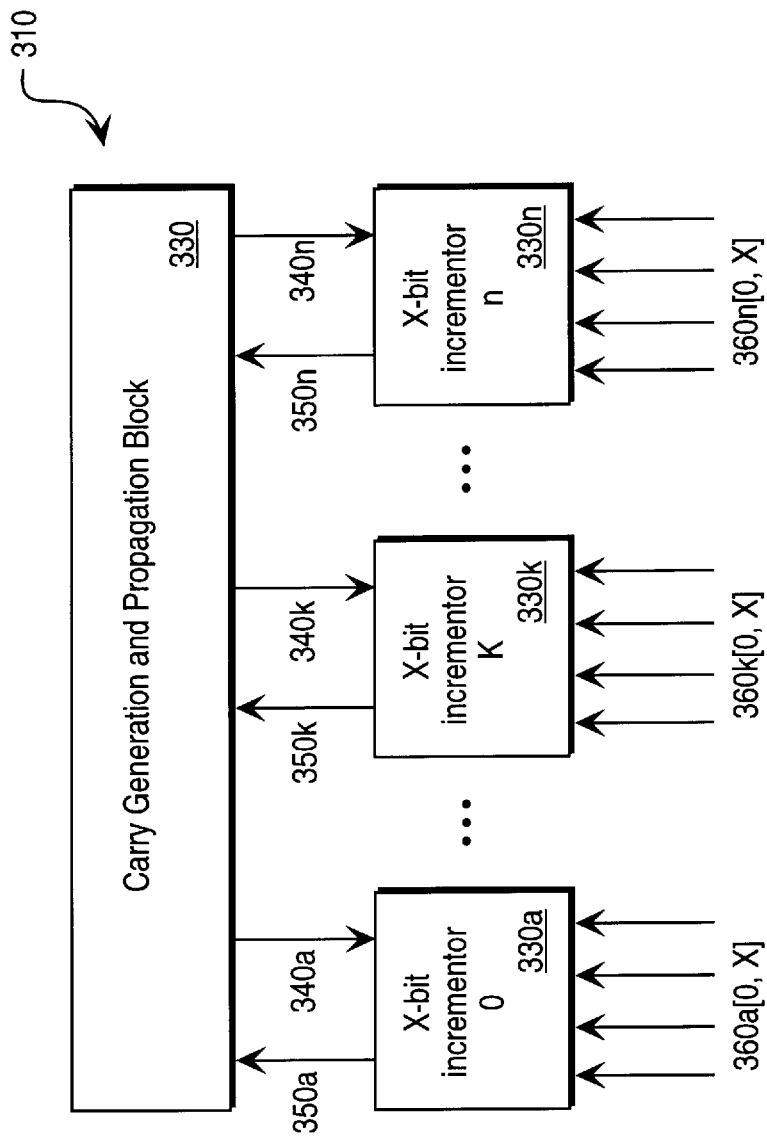
FIG. 3A is an overview block diagram of the present invention.

FIG. 3A is a block diagram of the incrementor of the present invention. The incrementor 310 contains a carry generation and propagation block (propagate block) 320 and n incrementor blocks 330a–230n, where n is any number. The incrementor blocks 330a–330n have inputs data lines 360a [0,X]–360n [0,X].

Each of the n incrementor blocks 330a–330n is X-bits. That is, incrementor blocks 330a–n act as smaller X-bit incrementors. Incrementor block 330a, for example, the data lines 360a [0,x] are inputs. Thus, incrementor 310 is a y-bit incrementor, where y=n*x. The incrementors additionally have an input 340a–n from the propagate block 320. Incrementor 330a has as an output the incremented sum, and Pout 350a, the propagate value. The propagate values 350a–n of the incrementor blocks are coupled to the propagate block 320 as well.

Figure 3B:
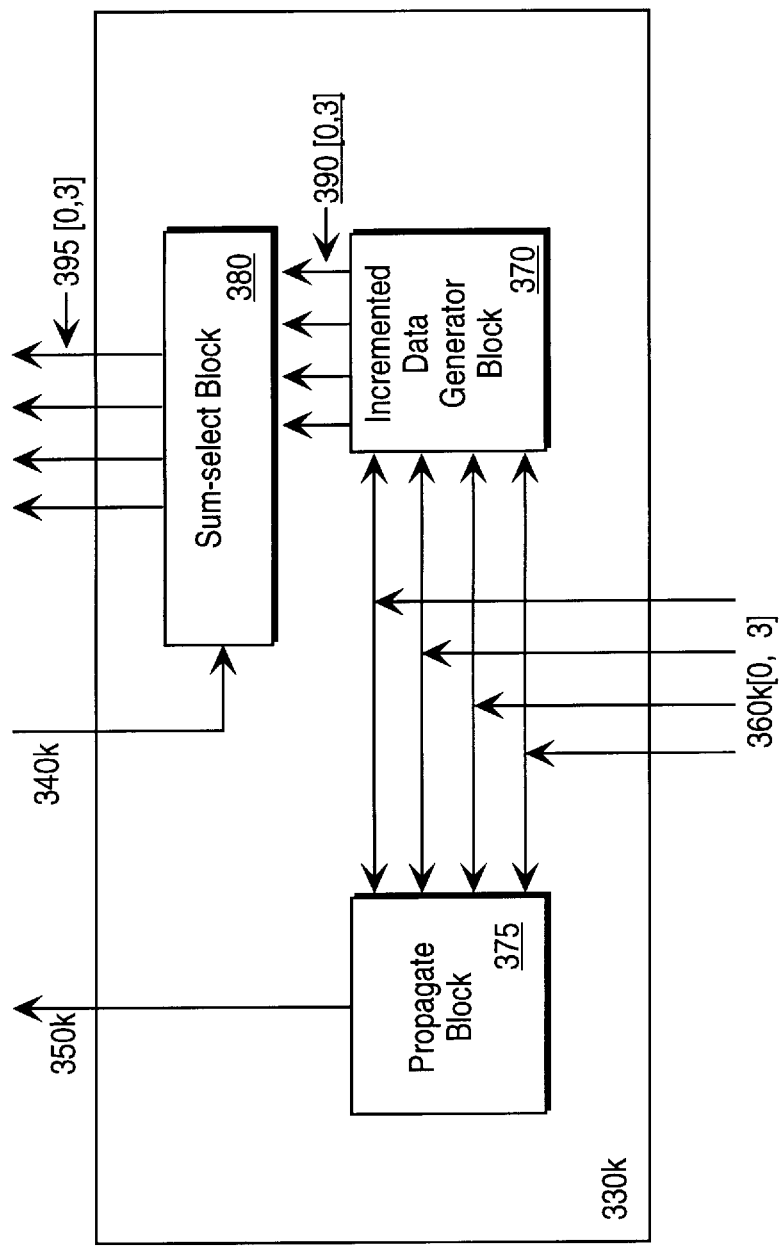
FIG. 3B is a block diagram of one embodiment of an incrementor block of the present invention.

FIG. 3B is a more detailed block diagram of an incrementor block 330k. In this illustration incrementor block 330k is a four-bit block, however, in an alternative embodiment, incrementor block 330k may have any other size. The incrementor block 330k has as an input data lines 360k [0,3]. The input data lines 360k are also input to a propagate block 375 and an incremented data generator block 370. The incremented data generator block 370 generates the incremented data for both cases, when there the carry-in is a one, or a zero. The output of the incremented data generator block 370 is input to the sum-select block 380. The sum select block 380 further has as an input the carry-out and inverted carry-out of the previous data block on line 340k. This is the carry-in of incrementor block 330k. Based on the value of the carry-in 340k, the sum select block 380 selects one of the two sums transmitted by the incremented data generator block 370. The output of the sum select block 380 is the incremented sum, on lines 395 [0,3]. The propagate block 375 also has as an input the input data lines 360k. The propagate block 375 calculates the propagate signal on line 350k of the incrementor block 330k. Thus it can be seen that the propagate signal and the sum is calculated in parallel. This speeds up the calculations of the incrementor block 330k. Furthermore, it reduces the number of logic blocks that each output has to drive, thus permitting reduction of the overall logic size.

Figure 4:
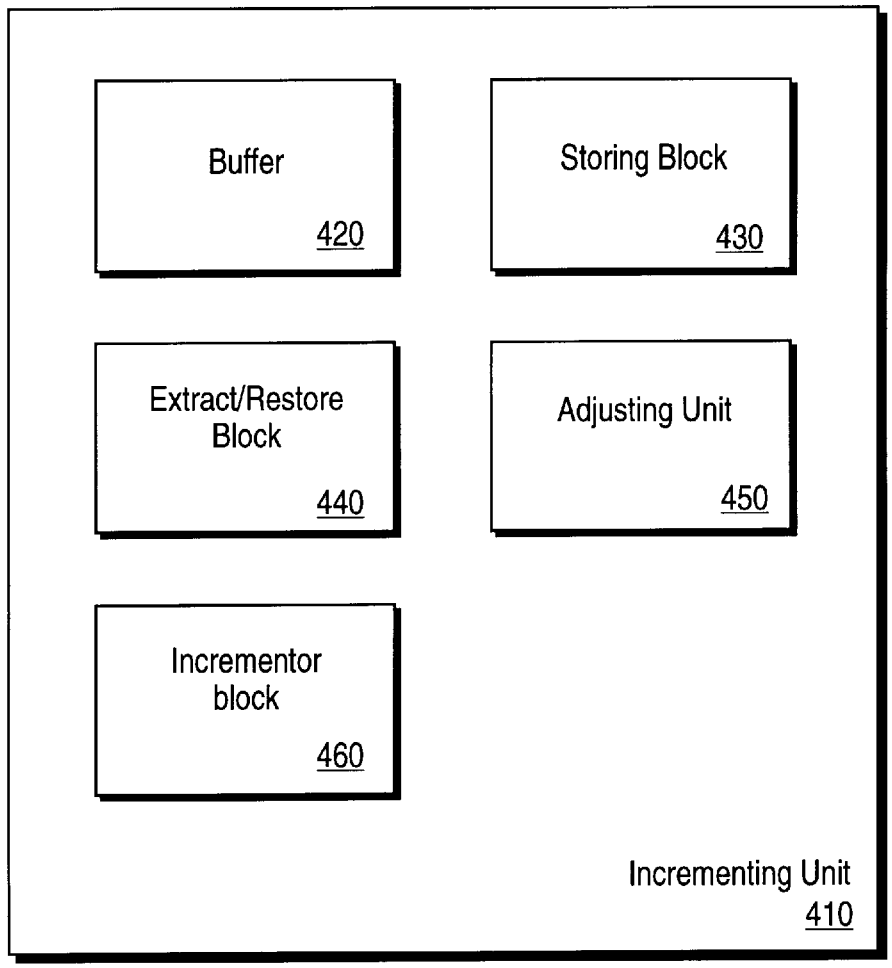
FIG. 4 is a block diagram of one embodiment of the overall incrementing unit of the present invention.

FIG. 4 is a block diagram illustrating the incrementing unit 410 of the present invention. In one embodiment, the incrementing unit 410 may be implemented in hardware, or in a processor of a computer system. The incrementing unit 410 can increment a value by 1, 2, 3, or any multiple of two. The incrementing unit 410 includes a buffer 420, for temporarily buffering the least significant bits, as will be described below. The incrementing unit 410 further includes a storing block 430, for storing the manipulated least significant bits, if necessary. In one embodiment, all least significant bits are stored in the buffer 420. Alternatively, some bits may be stored in the storing block 430.

Incrementor unit 410 further includes an extract/restore block 440, for extracting least significant bits, as will be described below. The extract/restore block 440 separates and combines least significant bits and more significant bits. In other words, the extract/restore block 440 "detaches" bits from the end of a number, and then reattaches them. This permits manipulating of the least sigifnicant bits and the more significant bits separately, prior to combining them. Thus, for example, the number 011110010100 may be separated into four least significant bits, 0100, and eight more significant bits, 01111001. Each of these two numbers may be manipulated separately. Thus, for example, the more significant bits may be incremented by one, resulting in 01111010. Then, the more significant bits, as incremented, 01111010, may be combined with the least significant bits, 0100, resulting in a new number 011110100100.

Incrementor unit 410 further includes an adjusting unit 450. The adjusting unit 450 is for manipulating the original number, least significant bits, or more significant bits. In one embodiment, the adjusting unit 450 may be an adder. Alternatively, the adjusting unit 450 may be an OR logic, in combination with a truth table. Finally, incrementor unit 410 includes an incrementor block 460. Incrementor block 460 increments a number by either zero or one. The incrementor block 460 may have as an input a carry-in bit, which determines by how much the incrementor increments a number.

Figure 5A:
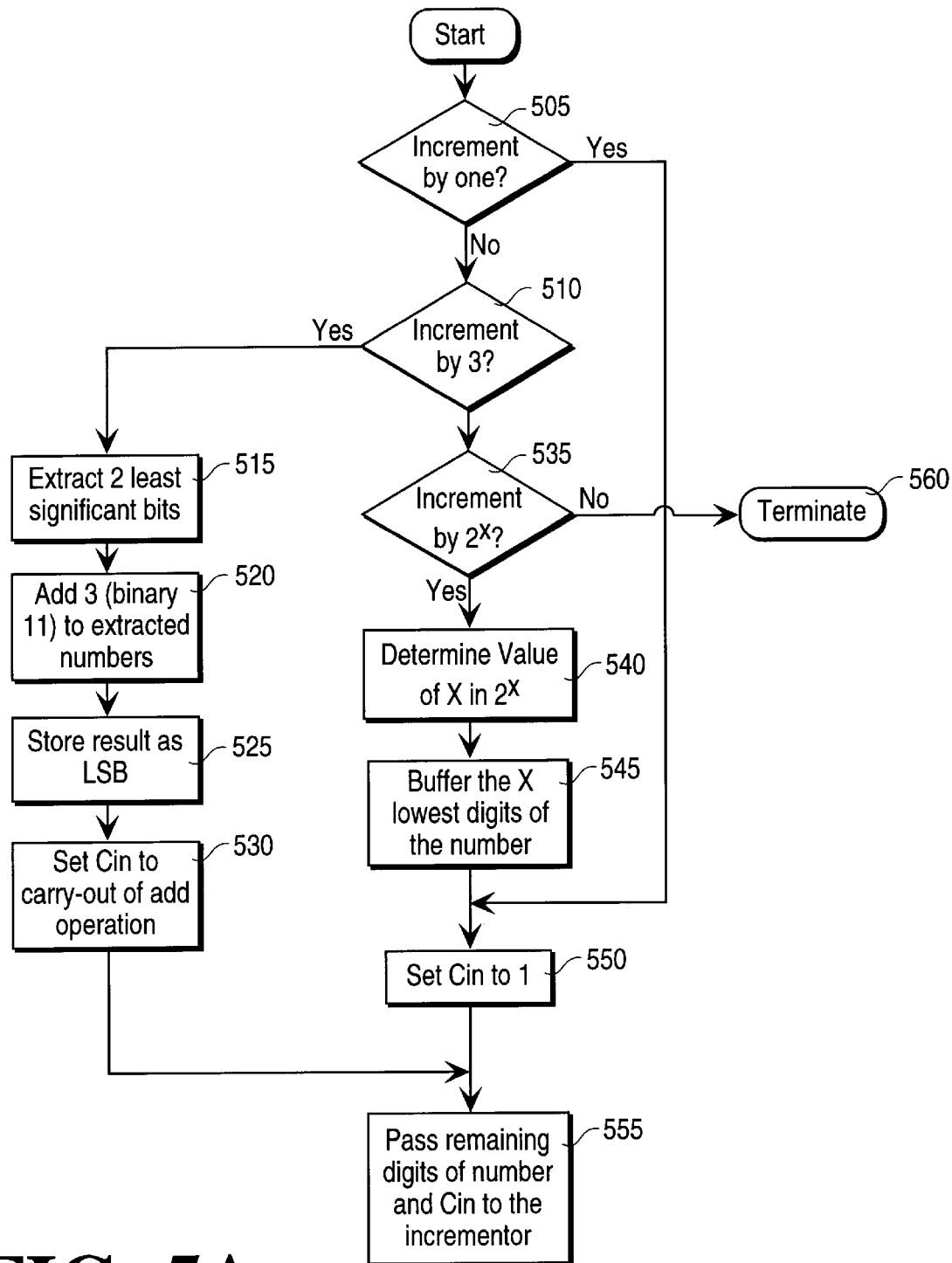
FIG. 5A is a flowchart illustrating the processing which occurs for various values of the incrementation, prior to the number being passed to the incrementor.

FIG. 5A is a flowchart illustrating the processing which occurs for various values of the incrementation, prior to the number being passed to the incrementor. The incrementor of the present invention can increment a number by one, two, or three. The incrementor of the present invention can further be used to increment a number by any power of two.

At block 505, the process determines whether the incrementation is by one. If it is, the process continues directly to block 555, and the number is passed to the incrementor. The first carry-in bit is a one. Thus, as the carry-in bit is added to the original number, the resulting sum is the original number plus one.

If the incrementation is not by one, the process continues to block 510. At block 510, the process determines whether the incrementation is by 3. If the incrementation is by 3, the process continues to block 515.

At block 515, the two least significant bits of the number to be incremented are extracted from the number. This leaves a remaining number, which has as its least significant bit the third least significant bit of the original number.

At block 520, the two least significant bits of the number, X and Y, to be incremented are added to 3. This occurs in a binary system, therefore three is $11_2$. Therefore, what occurs, is:

X Y+11=Result+Carry-out

Such a simple add function may be simplified using the truth table:

| XY | Result | Carry-out |
|----|--------|-----------|
| 00 | 11     | 0         |
| 01 | 00     | 1         |
| 10 | 01     | 1         |
| 11 | 11     | 1         |

The carry-out value and result may be calculated using a conventional two-bit adder. The carry-out function, however, is equal to an OR logic. Therefore, alternatively, the Carry-out may be calculated by having X and Y be inputs to an OR circuit. The output of the OR circuit is the Carry-out.

At block 525, the result of the add function is stored, as Least Significant Bits (LSB). The carry-out value calculated at block 520 is transmitted to the incrementor as a carry-in value.

At block 530, the carry-in value passed to the incrementor is set to the carry-out value of the add function executed at block 515. The process then continues to block 555. At block 555, the remaining digits of number and the carry-in value are passed to the incrementor. The remaining digits of the number are the original number with the least significant bits extracted in block 515.

If, at block 510, the incrementation was not by 3, the process continues to block 535. At block 535, the process determine whether the incrementation is by a power of two, i.e. $2^X$. If the incrementation is not by a power of two, the process continues to block 560. At block 560, the process terminates, because the present incrementor can not be utilized. If the incrementation is by a power of two, the process continues to block 540.

At block 540, the value of X, is determined. If the incrementation is by eight, for example, $8=2^3$. Therefore, in that example, X=3.

At block 545, the X lowest digits of the number are buffered. That is, the X lowest digits are extracted from the original number. The remaining number is X digits shorter than the original number. These X digits are temporarily stored in the buffer.

At block 550, the carry-in value transmitted to the incrementor is set to a one. At block 555, the remaining digits of the number are passed to the incrementor. Note that the remaining digits of the number passed to the incrementor is the number with the X lowest digits extracted, as described in block 545.

Figure 5B:
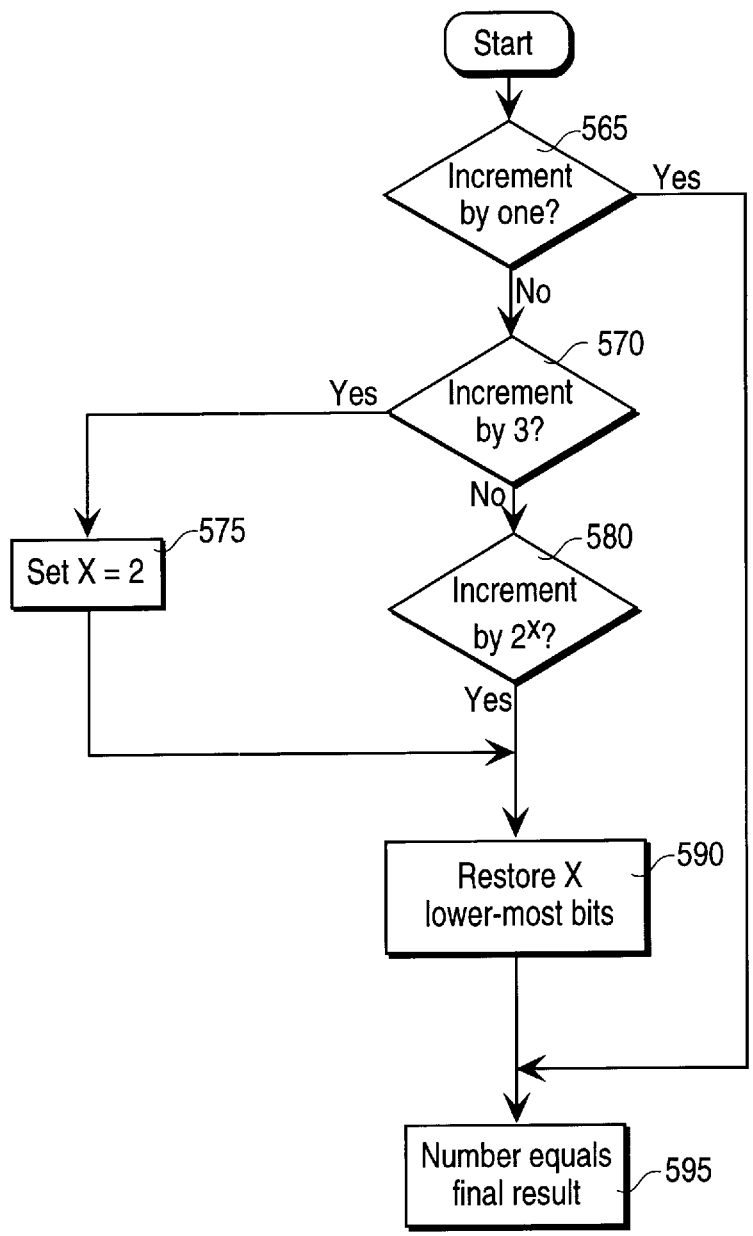
FIG. 5B is a flowchart illustrating the process of calculating the true result, based on the incrementing value by which the number was incremented.

FIG. 5B is a flowchart illustrating the process of calculating the true result, based on the incrementing value by which the number was incremented. The process starts, when the incremented result is received from the incrementor.

At block 565, the process determines whether the incrementation was by one. If the incrementation was by one, the process continues to block 595. At block 595, the number is set to be the final result of the incrementation.

At block 570, the process determines whether the incrementation was by three. If the incrementation was by 3, the process continues to block 575. At block 575, the value of X is set to 2. The process then continues to block 585.

If, at block 570, the process determined that the incrementation was not by three, the process continues to block 580. At block 580, the process determines whether incrementation was by a power of two. If the incrementation was by a power of two, the process continues to block 585.

At block 590, the X least significant bits of the number are restored. As discussed above with respect to FIG. 5A, the least significant bits are buffered and/or stored temporarily prior to incrementation. Thus, in this step, those buffered and/or stored digits are restored to the number. Thus, the length of the number increases by X.

At block 595, the result of the above process is set to the final result of the incrementation. Thus, if the incrementation was by a value other than 1, the above process manipulates the result to reflect the actual value.

Figure 6A:
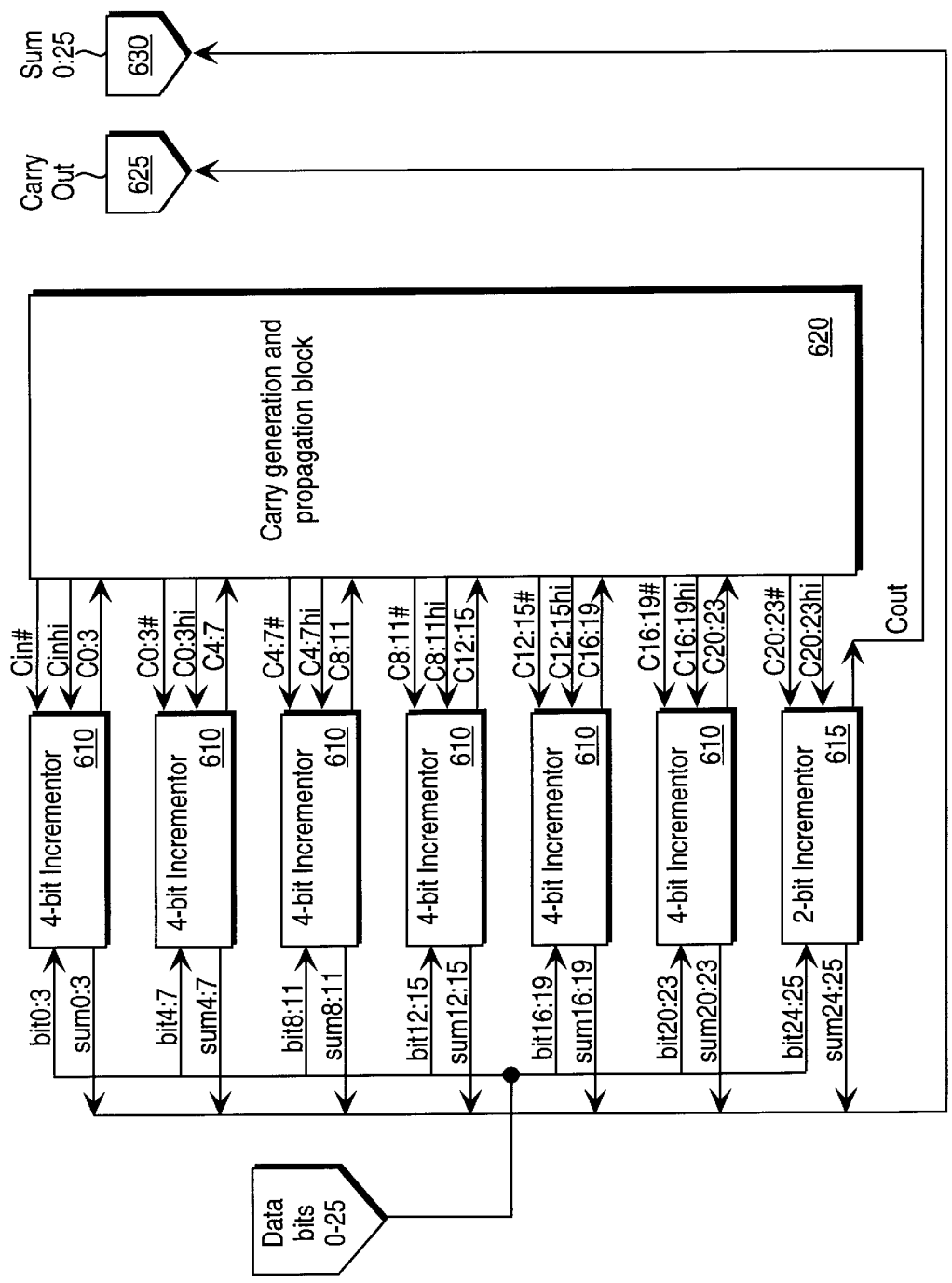
FIG. 6A is a more detailed diagram of one embodiment of a 16 bit incrementor, using the configuration of the present invention.

FIG. 6A is a more detailed diagram of one embodiment of a 26 bit incrementor, using the configuration of the present invention. Data bits 0–25 form the input to the incrementor 600. The incrementor 600 includes a smaller 4bit incrementors 610. Since the example is one which is a 26 bit incrementor, the present example includes six 4bit incrementors 610, and one 2bit incrementor 615. The data bits 0–25 are distributed among the incrementors, as illustrated. Thus, the first incrementor 610 has as an input bits 0–3, the second incrementor has as an input bits 4–7, and so on. Each incrementor 610, 615 calculates an incremented sum. The incrementor 610, 615 also has as an input the carry-in bit and its complement, which indicate whether there is a carry-in value which must be taken into consideration when calculating the value of the output sum. The carry-in bit for the first incrementor 610 is determined according to the process described above with respect to FIG. 5A. The carry-in bit for other incrementor blocks 610, 615 is the propagated value of the previous block. Each incrementor 610 615 has as an output a sum, which is a result of the incremented input bits, taking into consideration the carry-in bit. The incrementors 610, 615 further have as an output a carry-out bit, which indicates whether or not a bit needs to be carried to the next incrementor 610, 615. The carry-out is an input into carry generation and propagation block 620, while the carry-ins are generated by the carry generation and propagation block 620. The final carry out bit, in this case generated by the last 2bit incrementor 615, is the final carry out 625 of the incrementor. Each of the sums calculated by the incrementors 610, 615 are collected in order to produce the output sum 630. This output sum is processed as described in FIG. 5B. Each of these components are illustrated at the circuit level in FIGS. 6B–6D. The illustrations in the Figures below, however, are only examples. Alternative methods of implementing the present invention may be utilized.

Figure 6B:
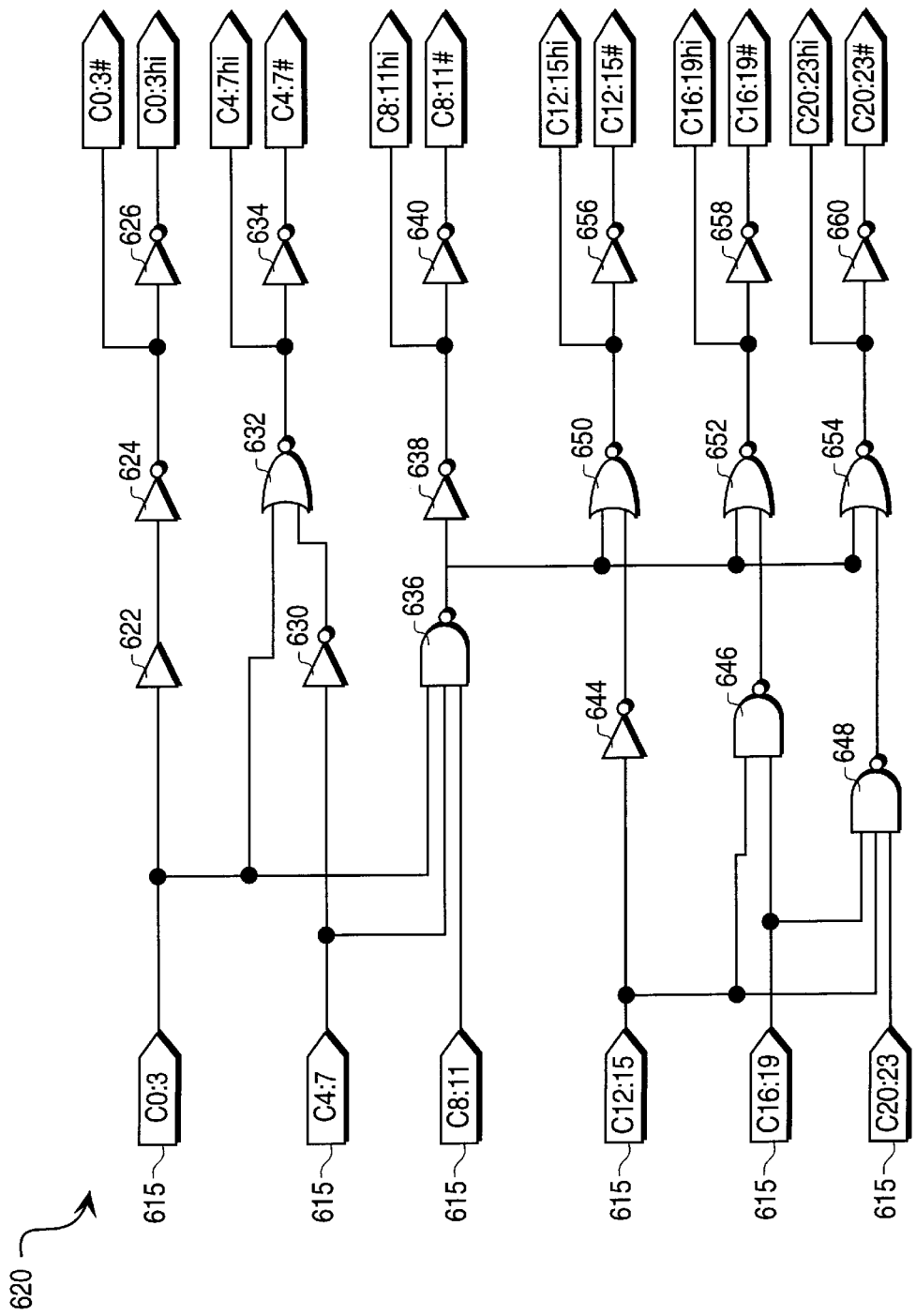
FIG. 6B is a circuit diagram of the carry generator/propagator utilized in FIG. 6A.

FIG. 6B is a circuit diagram of the carry generator/propagator utilized in FIG. 6A. The carry-in signals 615 are the outputs of the incrementors 610 illustrated in FIG. 6A. Carry-bits 0 to 3, C0:3, are an input to a buffer 622. The output of the buffer 622 is an input to an inverter 624. The output of inverter 624 is the carry-out bit C0:3#, low carry out. The output of a final inverter 626 is the inverted output C0:3hi.

Carry-bits 4 to 7, C4:7 are input to an inverter 630. The inverted carry-in signal and the C0:3 signal are an input to a NOR circuit 632. The output of the NOR circuit 632 is the carry-out bit C4:7hi. The output of a final inverter 634 is the inverted output C4:7#.

Carry-bits 8 to 11, C8:11, along with C4:7 and C0:3 are inputs to a NAND circuit 636, producing intermediate value C8:11int. The intermediate value C8:11int is inverted by inverter 638. This inverted result is the carry-out bit C8:11hi. The output of a final inverter 640 is the inverted output C8:11#. Thus carry-out bits C0:3#, C4:7#, and C8:11# are calculated substantially in parallel, rather than rippling through.

Carry-bits 12 to 15, C12:15, C16:19, and C20:23 are processed similarly as described above. C12:15 is input to an inverter 644, to produce intermediate result C12:15int. C16:19 and C12:15 are inputs to a NAND gate 646 to produce intermediate result C16:19int. And C20:23, C16:19, and C12:15 are inputs to NAND gate 648, and produce intermediate result C20:23int.

These intermediate value are inputs to NOR gates 650, 652, 654, respectively. The output of NAND circuit 636, intermediate value C8:11int, is the other input to each of the NOR gates 650, 652, 654. The output of the NOR gates 650, 652, and 654 are the final carry out values C12:15hi, C16:19hi, and C20:23hi, respectively. These outputs C12:15hi, C16:19hi, and C20:23hi are further put through inverters 656, 658, 660 respectively, to produce inverted outputs C12:15#, C16:19#, and C20:23#.

Thus, the carry generation logic is divided into two large blocks, carry logic for bits 0 through 11, and carry logic for bits 12 to 23. This permits further speeding up of the calculation process. Furthermore, by reducing the number of circuit elements driven from each input, the size of those circuit elements can be correspondingly reduced, thus saving space in addition to speeding up the process.

FIG. 6C is a circuit diagram of the 4-bit incrementor 610 utilized in FIG. 6A. The input to the 4-bit incrementor 610 are bits 0, 1, 2, and 3. It is to be understood that these can correspond to any four bits which are incremented. The output of incrementor 610 are the bits sum 0, 1, 2, and 3, and Cout, or carry-out value.

Sum0, the lowest bit of the incremented bit value, is produced as follows. Selector 712 includes two pass gates 702A, 702B. Each pass gate 702 includes a P-type MOS (PMOS) and an N-type MOS (NMOS), the sources and drains of the PMOS and NMOS coupled together. The two pass gates 702's are coupled in series, with the gate of NMOS 708 coupled to the gate of PMOS 706. The input to the source of NMOS 704 and PMOS 706 is bit 0. The input to the source of NMOS 708 and PMOS 710 is inverted bit 0, bit0#. Cin#, the inverted carry-in value is coupled to the gate of NMOS 708 and PMOS 706. Cin, the non-inverted carry-in value is coupled to the gate of NMOS 704 and PMOS 710. The drains of all NMOS and PMOS are coupled together, and are an intermediate output OUTint. The truth table for selector 712 is as follows:

| Cin | Cin# | OUTint |
|-----|------|--------|
| 1   | 0    | bit0   |
| 0   | 1    | bit0#  |

The output of selector 712 is an input to an inverter 714. The output of inverter 714 is sum0.

Sum 1, the next highest bit of incremented value, is produced as follows. Selector 716 is configured as described above with respect to selector 712. The input to the source of NMOS 718 and PMOS 720 is bit 0. The input to the source of NMOS 722 and PMOS 724 is the inverted bit 0#, which has been passed through inverter 726. The input to the gate of NMOS 718 and PMOS 724 is bit 1. The input to the gate of PMOS 720 and NMOS 722 is the inverted bit 1, bit1#. The drains of all NMOS and PMOS are coupled together. The drains are an input to inverter 726. Selector 728 is also configured as selector 720. The input to the gates are Cin and Cin#, as described above. The output of inverter 726 is coupled to the source of NMOS 730 and PMOS 732. The inverted bit 1, bit1# is coupled to the source of NMOS 734 and PMOS 736. The output of selector 728 is coupled to an inverter 738, and the output of the inverter 738, is sum 1.

Sum 2, the next highest bit of incremented value, is produced as follows. Selector 740 is configured as described above with respect to selector 712. NAND gate 741 has as inputs bit 0 and bit 1. The input to the source of NMOS 742 and PMOS 744 is the output of NAND gate 741. The input to the source of NMOS 746 and PMOS 748 is the inverted output of NAND gate 741, which has been passed through inverter 750. The input to the gate of NMOS 742 and PMOS 748 is bit 2. The input to the gate of PMOS 744 and NMOS 746 is the inverted bit 2, bit2#. The drains of all NMOS and PMOS are coupled together. The drains are an input to inverter 752. Selector 754 is also configured as selector 740. The input to the gates are Cin and Cin#, as described above. The output of inverter 752 is coupled to the source of NMOS 754 and PMOS 756. The non-inverted bit 2, bit1 is coupled to the source of NMOS 758 and PMOS 760. The output of selector 754 is coupled to an inverter 762, and the output of the inverter 762, is sum 2.

Sum 3, the highest bit of incremented value, is produced as follows. Selector 764 is configured as described above with respect to selector 712. NAND gate 766 has as inputs bits 0, 1, and 2. The input to the source of NMOS 768 and PMOS 770 is the output of NAND gate 766. The input to the source of NMOS 772 and PMOS 774 is the inverted output of NAND gate 766, which has been passed through inverter 776. The input to the gate of NMOS 768 and PMOS 774 is inverted bit3, bit3#, which has been passed through inverter 776. The input to the gate of PMOS 770 and NMOS 772 is uninverted bit 3, which has been passed through inverter 776 and inverter 778. The drains of all NMOS and PMOS are coupled together. The drains are an input to inverter 780.

Selector 782 is also configured as selector 764. The input to the gates are Cin and Cin#, as described above. The output of inverter 780 is coupled to the source of NMOS 784 and PMOS 786. The uninverted bit 3, having passed through inverter 776 and inverter 792 is coupled to the source of NMOS 788 and PMOS 790. The output of selector 782 is coupled to an inverter 794, and the output of the inverter 794, is sum 3.

To produce Carry out, Cout, signal, bit 0 and bit 1 are inputs to NAND circuit 796, and bits 2 and 3 are input to NAND circuit 798. The outputs of NAND circuit 796 and NAND circuit 798 are inputs to a NOR circuit 799. The output of the NOR circuit 799 is the carry out signal of the incrementor 615.

Figure 6D:
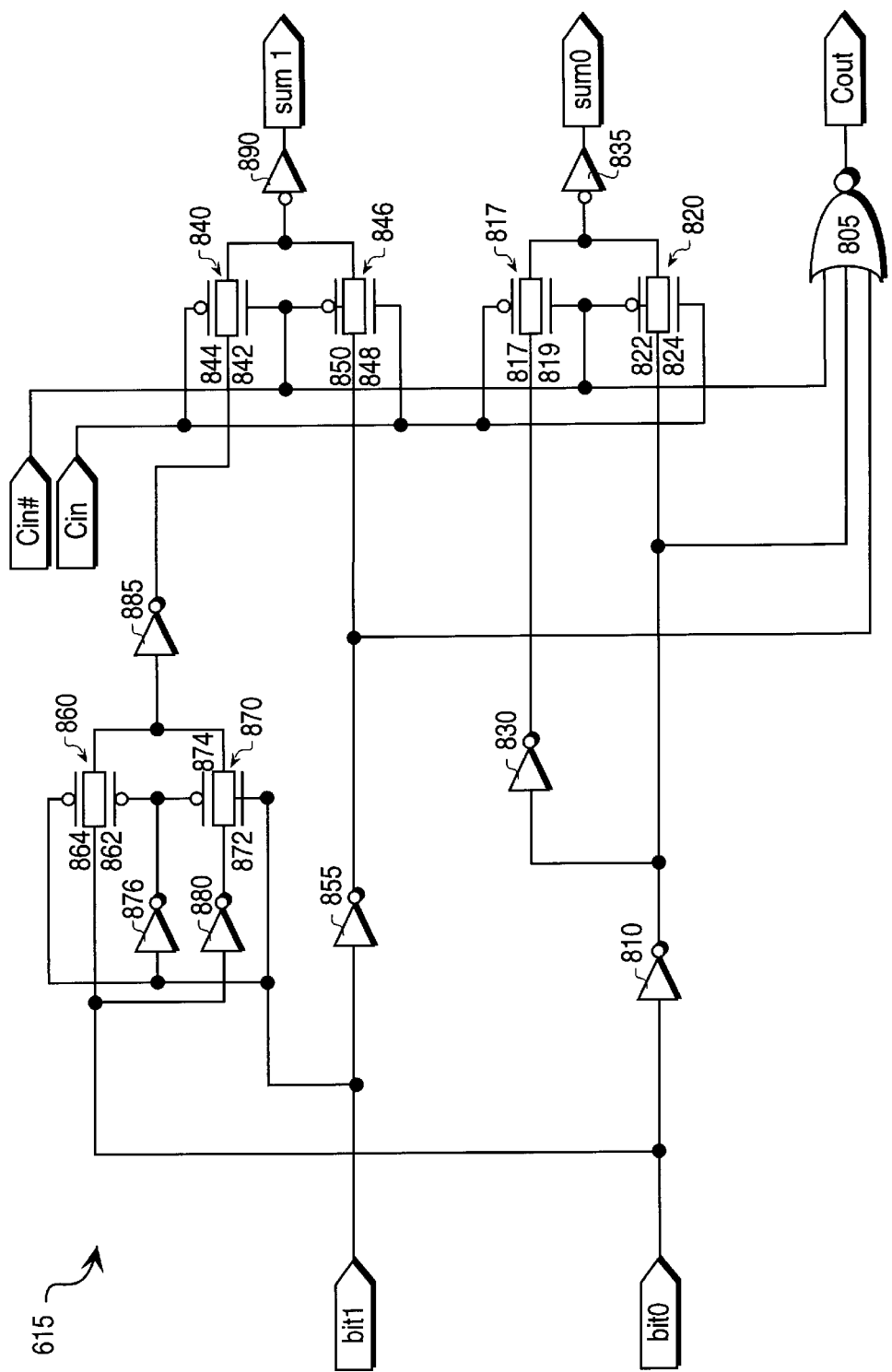
FIG. 6D is a circuit diagram of the 2-bit incrementor utilized in FIG. 6A.

FIG. 6D is a circuit diagram of the 2-bit incrementor 615 utilized in FIG. 6A. It is to be understood that in this example only one 2-bit incrementor 615 is used. However, in an alternative embodiment, the incrementor 600 is made up entirely of 2-bit incrementor units 615. The input to the 2-bit incrementor unit 615 are bit0 and bit1. In FIG. 6A, the incrementor 615 is illustrated as being the last incrementor block, thus the two input bits would be bit24 and bit25. However, the naming of such bits is irrelevant.

Cout, the carry-out bit is the output of an XNOR gate 805. The XNOR gate 805 has as inputs bit 0, bit 1, and Cin#, the inverted carry-in bit.

Sum 0, is generated as follows. Bit 0 is inverted by inverter 810. Pass gate 815 consists of NMOS 817 and PMOS 819 with the sources and drains of NMOS 817 and PMOS 819 coupled. Pass gate 820 consists of NMOS 822 and PMOS 824 with their sources and drains coupled. Pass gate 815 and pass gate 820 are coupled in parallel, with the gate of PMOS 819 coupled to the gate of NMOS 822. The inverted carry-in signal, Cin#, is coupled to the gates of PMOS 819 and NMOS 822. The uninverted carry-in signal, Cin, is coupled to the gates of NMOS 817 and PMOS 824. The output of inverter 810, the bit 0, is coupled to the sources of NMOS 822 and PMOS 824. The uninverted bit 0, the output of inverter 830, which has as an input the output of inverter 810, is coupled to the sources of NMOS 817 and PMOS 819. The output of pass gate 815 and pass gate 820 are coupled together, and connected to an inverting pass gate 835. The output of the inverting pass gate 835 is sum 0.

Sum 1 is generated similarly. Pass gate 840 consists of NMOS 842 and PMOS 844, with their sources and drains coupled. Pass gate 846 consists of NMOS 848 and PMOS 850 with their sources and drains coupled. Pass gate 840 and pass gate 846 are coupled in parallel, with the gate of PMOS 844 and NMOS 848 coupled together. The signal Cin# is coupled to the gate of PMOS 844 and NMOS 848. The signal Cin is coupled to the gate of NMOS 842 and PMOS 850. Inverted bit 1, bit1#, inverted by inverter 855, is coupled to the source of NMOS 848 and PMOS 850.

Pass gate 860 consists of NMOS 862 and PMOS 864, with their sources and drains coupled. Pass gate 870 includes NMOS 872 and PMOS 874, with their source and drains coupled. Pass gates 860 and pass gate 870 are coupled in parallel, with the gate of PMOS 874 and NMOS 862 coupled together. The inverted bit 1, bit1#, inverted by inverter 876 is coupled to the gate of PMOS 874 and NMOS 862. Bit 1 is coupled to the gate of NMOS 872 and PMOS 864. Bit 0 is coupled to the source of NMOS 862 and PMOS 864. Inverted bit 0, bit0#, inverted by inverter 880, is coupled to the source of NMOS 872 and PMOS 874. The drains of NMOS 862, PMOS 864, NMOS 872 and PMOS 874 are coupled together, and are the input to inverter 885. The output of inverter 885 is coupled to the source of pass gate 840, i.e. NMOS 842 and PMOS 844. The drains of NMOS 842, PMOS 844, NMOS 848, and PMOS 850 are coupled together and coupled to inverter 890. The output of inverter 890 is sum 1.

Thus it can be seen that 2-bit inverter 615 is similar to 4-bit inverter 610. In a similar way, inverters of varying sizes may be created to suit any need. Such smaller inverter blocks may be coupled together as described herein to form larger inverters. In this way, the present invention describes a faster and simpler inverter, which consists of smaller inverter units.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The present invention should not be construed as limited by such embodiments and examples, but rather construed according to the following claims.

What is claimed is:

1. An incrementor unit for incrementing a binary number by an incrementing value of one, two, or three, the incrementor comprising:

an extract/restore unit for separating the binary number into least significant bits and a plurality of more significant bits;

an adjusting unit for adjusting the least significant bits if the incrementing value is a three;

an incrementor for incrementing the plurality of more significant bits; and the extract/restore unit for combining said least significant bits and the incremented plurality of more significant bits.

2. The incrementor unit of claim 1, wherein the incrementing value is two raised to an N-th power and wherein a number of bits in the least significant bits extracted by the extract/restore unit is N.

3. The incrementor unit of claim 1 further comprising:

the extract/restore unit for setting a number of bits in said least significant bits equal to two, if the incrementing value is a three.

4. The incrementor unit of claim 1, wherein the adjusting unit adds a three to the least significant bits.

5. The incrementor unit of claim 4, wherein the adjusting unit is an adder.

6. The incrementor unit of claim 4 further comprising:

the adjusting unit for generating a carry-out value, the carry-out value being an input to the incrementor.

7. The incrementor unit of claim 6, wherein the carryout value generated by the adjusting unit is the incrementing value used by the incrementor.

8. The incrementor unit of claim 4, wherein the adjusting unit comprises:

an OR logic having as an input a least significant bit and a second least significant bit, the OR logic for generating a carry-out bit; and a memory including a truth table for generating a result of adding a number to said least significant bit.

9. The incrementor unit of claim 1, further comprising:

a buffer for buffering said least significant bits.

10. The incrementor unit of claim 1 wherein said incrementor comprises:
   a first subsection having a first plurality of data lines as an input, the first subsection for calculating an incremented output and a carry-out value;
   a second subsection having a second plurality of data lines as the input, the second subsection for calculating a first value of an incremented sum for a carry-in value of zero and a second value of the incremented sum for the carry-in value of one; and
   a carry generation and propagation block for receiving the carry-out value generated by the first subsection, the carry generation and propagation block further for generating a selector which selects the first value or the second value of the incremented sum based on the calculated carry-out value calculated by the first subsection.

11. An incrementor unit for incrementing a binary number by two raised to the power of X, the incrementor unit comprising:
   an extract/restore unit designed to determine X;
   the extract/restore unit designed to separate the binary number into the X least significant bits and more significant bits;
   an incrementor for incrementing the more significant bits by one; and
   the extract/restore unit for combining the X least significant bits and the more significant bits, as incremented.

12. The incrementor unit of claim 11, further comprising:
   a buffer for buffering the X least significant bits.

13. The incrementor unit of claim 11, wherein said incrementor comprises:
   a first subsection having a first plurality of data lines as an input, the first subsection for calculating an incremented output and a carry-out value;
   a second subsection having a second plurality of data lines as the input, the second subsection for calculating a first value of an incremented sum for a carry-in value of zero and a second value of the incremented sum for the carry-in value of one; and
   a carry generation and propagation block for receiving the carry-out value generated by the first subsection, the carry generation and propagation block further for generating a selector which selects the first value or the second value of the incremented sum based on the calculated carry-out value calculated by the first subsection.

14. An incrementor unit for incrementing a binary number by three, the incrementor unit comprising:
   an extract/restore unit for separating the binary number into two least significant bits and a plurality of more significant bits;
   an adjusting unit for adding three to the two least significant bits, and for calculating a carry-out value;
   a storage unit for storing the two least significant bits, as adjusted;
   an incrementor for receiving the carry-out value of the adjusting unit, and for incrementing the plurality of more significant bits by the carry-out value of the adjusting unit; and
   the extract/restore unit for combining the plurality of more significant bits as incremented with the two least significant bits as adjusted.

15. The incrementor unit of claim 14 wherein the adjusting unit is designed to generate a carry-out value, the carry-out value an input to the incrementor.

16. The incrementor unit of claim 15 wherein the adjusting unit is an adder.

17. The incrementor unit of claim 15, wherein the adjusting unit comprises:
   an OR logic having as an input a least significant bit and a second least significant bit, the OR logic for generating a carry-out bit; and
   a memory including a truth table for generating a result of adding a number to said least significant bit.

18. The incrementor unit of claim 14 wherein said incrementor comprises:
   a first subsection having a first plurality of data lines as an input, the first subsection for calculating an incremented output and a carry-out value;
   a second subsection having a second plurality of data lines as the input, the second subsection for calculating a first value of an incremented sum for a carry-in value of zero and a second value of the incremented sum for the carry-in value of one; and
   a carry generation and propagation block for receiving the carry-out value generated by the first subsection, the carry generation and propagation block further for generating a selector which selects the first value or the second value of the incremented sum based on the calculated carry-out value calculated by the first subsection.

19. An incrementor unit for incrementing a binary number by an add value, the incrementor unit comprising:
   a first means for determining if the add value is one, three, or $2^X$;
   a second means for buffering X least significant bits if the add value is $2^X$ and for extracting two least significant bits if the add value is three;
   an incrementing means for incrementing a remaining bits of the binary number;
   an adjusting means for adjusting the two least significant bits extracted when the add value is three; and
   a combination means for combining the incremented remaining bits and the least significant bits removed by the second means.

20. The incrementor unit of claim 19, wherein the incrementor comprises:
   a first means having a first plurality of data lines as an input, the first means for calculating an incremented output and a carry-out value;
   a second means having a second plurality of data lines as the input, the second means for calculating a first value of an incremented sum for a carry-in value of zero and a second value of the incremented sum for the carry-in value of one; and
   a third means for receiving the carry-out value generated by the first means, the third means further for generating a selector which selects the first value or the second value of the incremented sum based on the calculated carry-out value calculated by the first means.

* * * * *

UNITED STATES PATENT AND TRADEMARK OFFICE
CERTIFICATE OF CORRECTION

PATENT NO.   : 5,889,693                                                    Page 1 of 1
DATED        : March 30, 1999
INVENTOR(S)  : Joshi et al.

It is certified that error appears in the above-identified patent and that said Letters Patent is hereby corrected as shown below:

Column 9,
Line 41, immediately before "bit 0", insert -- inverted --.

Signed and Sealed this

Second Day of December, 2003

JAMES E. ROGAN
*Director of the United States Patent and Trademark Office*